US009848083B2

(12) United States Patent
Merrow et al.

(10) Patent No.: US 9,848,083 B2
(45) Date of Patent: *Dec. 19, 2017

(54) SPEECH RECOGNITION METHOD OF AND SYSTEM FOR DETERMINING THE STATUS OF AN ANSWERED TELEPHONE DURING THE COURSE OF AN OUTBOUND TELEPHONE CALL

(71) Applicant: Eliza Corporation, Beverly, MA (US)

(72) Inventors: Lucas Merrow, Rollinsford, NH (US); Alexandra Drane, Winchester, MA (US); John Krocker, Hamilton, MA (US); Oleg Boulanov, Beverly, MA (US); Nasreen R. Quibria, Newton, MA (US); Michael R. Robinson, Scottsdale, AZ (US)

(73) Assignee: Eliza Corporation, Beverly, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/063,587

(22) Filed: Mar. 8, 2016

(65) Prior Publication Data

US 2016/0248910 A1     Aug. 25, 2016

Related U.S. Application Data

(63) Continuation of application No. 13/717,082, filed on Dec. 17, 2012, now Pat. No. 9,313,312, which is a
(Continued)

(51) Int. Cl.
*H04M 1/64*     (2006.01)
*H04M 3/51*     (2006.01)
(Continued)

(52) U.S. Cl.
CPC .......... *H04M 3/5158* (2013.01); *G10L 17/06* (2013.01); *G10L 25/51* (2013.01); *G10L 25/87* (2013.01);
(Continued)

(58) Field of Classification Search
CPC .. H04M 2201/40; H04M 3/493; H04M 3/533; H04M 3/53333; H04M 2203/2027;
(Continued)

(56) References Cited

U.S. PATENT DOCUMENTS 4,599,288 A    7/1986   Fuchizawa
4,667,065 A    5/1987   Bangerter
(Continued)

FOREIGN PATENT DOCUMENTS

DE          19901137 A1    7/2000
JP           58131856 A1    8/1983
(Continued)

OTHER PUBLICATIONS

PCT International Search Report, International Filing Date Aug. 31, 2001, International Application No. PCT/US01/27061, 2001.
(Continued)

*Primary Examiner* — Akelaw Teshale
(74) *Attorney, Agent, or Firm* — McDermott Will & Emery LLP (57) ABSTRACT

A system for determining the status of an answered telephone during the course of an outbound telephone call includes an automated telephone calling device for placing a telephone call to a location having a telephone number at which a target person is listed, upon the telephone call being answered, initiating a prerecorded greeting which asks for the target person and receiving a spoken response from an answering person and a speech recognition device for performing a speech recognition analysis on the spoken response to determine a status of the spoken response. If the speech recognition device determines that the answering person is the target person, the speech recognition device initiates a speech recognition application with the target person.

20 Claims, 3 Drawing Sheets

Related U.S. Application Data continuation of application No. 11/219,593, filed on Sep. 2, 2005, now Pat. No. 8,363,792, which is a continuation of application No. 09/945,282, filed on Aug. 31, 2001, now Pat. No. 6,990,179.

(60) Provisional application No. 60/229,774, filed on Sep. 1, 2000.

(51) Int. Cl.

| | |
|---|---|
| *H04M 1/82* | (2006.01) |
| *H04M 3/46* | (2006.01) |
| *G10L 17/06* | (2013.01) |
| *G10L 25/51* | (2013.01) |
| *G10L 25/87* | (2013.01) |
| *G10L 15/26* | (2006.01) |
| *H04M 1/27* | (2006.01) |
| *H04M 3/487* | (2006.01) |

(52) U.S. Cl.
CPC ............... *H04M 1/64* (2013.01); *H04M 1/82* (2013.01); *H04M 3/46* (2013.01); *G10L 15/26* (2013.01); *H04M 1/271* (2013.01); *H04M 3/487* (2013.01); *H04M 2201/40* (2013.01); *H04M 2203/2016* (2013.01); *H04M 2203/2027* (2013.01)

(58) Field of Classification Search
CPC .. H04M 11/06; H04M 1/2478; H04M 3/4936; H04M 3/5158; H04M 3/53325; H04M 2201/60; H04M 3/537; H04M 7/006; H04M 2203/2016; H04M 1/57; H04M 1/64; H04M 1/271; H04M 1/82; H04M 3/46; H04M 3/487; H04M 1/006; H04M 1/2535; H04M 1/575; H04M 1/6505; H04M 2207/18; H04M 3/323
USPC ......... 379/88.01, 80, 88.02, 37, 67.1, 88.04, 379/88.13, 88.16, 93.01, 93.17, 142.04, 379/201.02, 204.01, 211.02, 339, 360, 379/368, 39, 45, 88.12, 88.17, 88.18, 379/88.19, 93.25, 69, 266.07, 266.1, 379/114.03, 142.06, 218.02, 262, 265.01, 379/265.02, 88.03, 93.12, 265.11, 447, 379/126, 265.05, 27.01, 88.14, 9, 127.03, 379/142.14, 142.17, 159, 15.01, 160, 379/167.05, 207.02, 207.05, 209.01, 379/210.01, 211.04, 216.01, 221.09, 379/221.12, 265.06, 265.09, 265.12, 379/265.13, 355.02, 38, 88.11, 88.22, 379/88.27
See application file for complete search history.

(56) References Cited

U.S. PATENT DOCUMENTS

| | | | |
|---|---|---|---|
| 4,761,807 A | 8/1988 | Matthews et al. | |
| 4,941,168 A | 7/1990 | Kelly | |
| 5,333,180 A | 7/1994 | Brown et al. | |
| 5,430,792 A | 7/1995 | Jesurum et al. | |
| 5,475,748 A | 12/1995 | Jones | |
| 5,488,652 A | 1/1996 | Bielby et al. | |
| 5,511,112 A | 4/1996 | Szlam | |
| 5,594,791 A | 1/1997 | Szlam et al. | |
| 5,638,424 A | 6/1997 | Denio et al. | |
| 5,644,624 A | 7/1997 | Caldwell | |
| 5,649,057 A | 7/1997 | Lee et al. | |
| 5,652,789 A | 7/1997 | Miner et al. | |
| 5,787,151 A * | 7/1998 | Nakatsu | H04M 3/533 379/88.04 |
| 5,797,124 A | 8/1998 | Walsh et al. | |
| 5,802,160 A * | 9/1998 | Kugell | H04M 3/465 370/261 |
| 5,809,113 A | 9/1998 | Lieuwen | |
| 5,828,731 A | 10/1998 | Szlam | |
| 5,832,063 A * | 11/1998 | Vysotsky | G10L 15/065 379/189 |
| 5,915,001 A * | 6/1999 | Uppaluru | H04M 3/4938 379/88.17 |
| 5,953,393 A | 9/1999 | Culbreth et al. | |
| 5,978,450 A | 11/1999 | McAllister et al. | |
| 6,038,305 A | 3/2000 | McAllister et al. | |
| 6,075,844 A | 6/2000 | Goldberg et al. | |
| 6,094,632 A | 7/2000 | Hattori | |
| 6,101,242 A | 8/2000 | McAllister et al. | |
| 6,167,119 A * | 12/2000 | Bartholomew | H04Q 3/0045 379/201.02 |
| 6,178,230 B1 * | 1/2001 | Borland | H04M 1/578 379/153 |
| 6,584,316 B1 * | 6/2003 | Akhteruzzaman | H04W 36/32 455/417 |
| 6,633,846 B1 | 10/2003 | Bennett et al. | |
| 6,836,537 B1 * | 12/2004 | Zirngibl | H04M 3/493 379/201.1 |
| 7,006,605 B1 | 2/2006 | Morganstein et al. | |
| 2001/0005372 A1 * | 6/2001 | Cave | H04L 29/06 370/401 |
| 2001/0014599 A1 * | 8/2001 | Henderson | H04M 1/57 455/412.1 |
| 2002/0112007 A1 * | 8/2002 | Wood | G06Q 10/107 709/206 |
| 2012/0077518 A1 * | 3/2012 | Logan | G08B 13/1427 455/456.1 |

FOREIGN PATENT DOCUMENTS

| | | |
|---|---|---|
| JP | 2119371 | 5/1990 |
| JP | 63253758 | 10/1998 |
| WO | 9208309 A1 | 5/1992 |
| WO | 9852340 A1 | 11/1998 |

OTHER PUBLICATIONS

Hunt, M.J., et al., Survey of the State of the Art in Human Language Technology, National Science Foundation Directorate X111-E of the Commission of the EP Community Center for Spoken Language Understanding, Oregon Graduate Institute, pp. 11-69, 1995.

Cox. R.V. et al., Speech and Language Processing for Next-Millennium Communication Services, Proceedings of the IEEE, 88:1314-1337, 2000.

Zue et al., Conversational Interfaces: Advances and Challenges, Proceedings of the IEEE, 88:1166-1180, 2000.

Foster et al., Speech Recognition, the Complete Practical Reference Guide, ISBN 0-9366-48-39-2, pp. 38-39, 1993.

\* cited by examiner

SPEECH RECOGNITION METHOD OF AND SYSTEM FOR DETERMINING THE STATUS OF AN ANSWERED TELEPHONE DURING THE COURSE OF AN OUTBOUND TELEPHONE CALL

CROSS REFERENCES TO RELATED APPLICATIONS

This application is a continuation of U.S. patent application Ser. No. 13/717,082 filed on Dec. 17, 2012, which is a continuation of U.S. patent application Ser. No. 11/219,593 filed Sep. 2, 2005, now U.S. Pat. No. 8,363,792 issued Jan. 29, 2014, which is a continuation of U.S. patent application Ser. No. 09/945,282 filed Aug. 31, 2001, now U.S. Pat. No. 6,990,179 issued Jan. 24, 2006, which claims the benefit of priority from U.S. Provisional Patent Application Ser. No. 60/229,774, filed Sep. 1, 2000, entitled APPLICATION OF AUTOMATIC SPEECH RECOGNITION TO OUTBOUND CALLS.

FIELD OF THE INVENTION

The present invention relates generally to a method of and system for determining the status of an answered telephone during the course of an outbound telephone call, and more particularly to a method and system which utilizes speech recognition to identify and/or locate a particular person during the course of an outbound telephone call.

BACKGROUND OF THE INVENTION

In the new, connected economy, it has become increasingly important for companies or service providers to become more in tune with their clients and customers. Such contact can be facilitated with automated telephonic transaction systems, in which interactively-generated prompts are played in the context of a telephone transaction, and the replies of a human user are recognized by an automatic speech recognition system. The answers given by the respondent are processed by the system in order to convert the spoken words to meaning, which can then be utilized interactively, or stored in a database.

In order for a computer system to recognize the words that are spoken and convert these words to text, the system must be programmed to phonetically break down the words and convert portions of the words to their textural equivalents. Such a conversion requires an understanding of the components of speech and the formation of the spoken word. The production of speech generates a complex series of rapidly changing acoustic pressure waveforms. These waveforms comprise the basic building blocks of speech, known as phonemes. Vowel and consonant sounds are made up of phonemes and have many different characteristics, depending on which components of human speech are used. The position of a phoneme in a word has a significant effect on the ultimate sound generated. A spoken word can have several meanings, depending on how it is said. Speech scientists have identified allophones as acoustic variants of phonemes and use them to more explicitly define how a particular word is formed.

While there are several distinct methods for analyzing the spoken word and extracting the information necessary to enable the recognition system to convert the speech to word-strings, including Hidden Markov modeling and neural networks, these methods generally perform similar operations. The differences in these methods are typically in the manner in which the system determines how to break the phonetic signal into portions that define phonemes. Generally, a speech recognition system first converts an incoming analog voice signal into a digital signal. The second step is called feature extraction, wherein the system analyzes the digital signal to identify the acoustic properties of the digitized signal. Feature extraction generally breaks the voice down into its individual sound components. Conventional techniques for performing feature extraction include subband coding Fast Fourier Transforms and Linear Predictive Coding. Once the signal has been analyzed, the system then determines where distinct acoustic regions occur. The goal of this step is to divide the acoustic signal into regions that will be identified as phonemes which can be converted to a textual format. In isolated word systems, this process is simplified, because there is a pause after each word. In continuous speech systems, however, this process is much more difficult, since there typically are no breaks between words in the acoustic stream. Accordingly, the system must be able not only to break the words themselves into distinct acoustic regions, but must also be able to separate consecutive words in the stream. It is in this step that conventional methods such as Hidden Markov modeling and neural networks are used. The final step involves comparing a specific acoustic region, as determined in the previous step, to a known set of templates in a database in order to determine the word or word portion represented by the acoustic signal region. If a match is found, the resulting textual word is output from the system. If one is not, the signal can either be dynamically manipulated in order to increase the chances of finding a match, or the data can be discarded and the system prompted to repeat the query to the respondent, if the associated answer cannot be determined due to the loss of the data.

In customer service applications, it is important for service providers to be able to obtain information from, or to provide information to, their customers. Oftentimes, service providers will need to contact customers via the telephone to obtain or provide the desired information. In order to reduce the costs associated with such information exchanges, many service providers utilize automated telephone calling devices to contact customers. However, if someone other than the particular person being called answers the telephone, the information exchange will most likely be unsuccessful and the service provider will have wasted valuable resources.

SUMMARY OF THE INVENTION

The present invention is directed to a method of and system for determining the status of an answered telephone during the course of an outbound call. The system includes an automated telephone calling system which initiates a telephone call to a target person listed at a particular telephone number. When the telephone call is answered, the system first determines whether a live person or an answering machine has answered the telephone. If an answering machine is detected, the system leaves a message for the target person. If a live person answers the telephone, the system utilizes a speech recognition analysis to determine the status of the answering person and to attempt to locate the target person, if the answering person is not the target person.

According to one aspect of the invention, a method of determining the status of an answered telephone during the course of an outbound telephone call includes:

A. placing, with an automated calling system, a telephone call to a location having a telephone number at which a target person is listed;

B. upon the telephone call being answered, initiating a prerecorded greeting which asks for the target person;

C. receiving a spoken response from an answering person;

D. performing a speech recognition analysis on the spoken response to determine a status of the spoken response; and E. if the speech recognition analysis determines that the answering person is the target person, initiating a speech recognition application with the target person.

If the speech recognition analysis determines that the spoken response indicates that the answering person is not the target person, a next step may include initiating a prerecorded query asking for the target person. Upon the target person answering the telephone call, the method may further include initiating a speech recognition application with the target person. If the speech recognition analysis determines that the spoken response indicates that the target person is not present at the location, a next step may include initiating a prerecorded query asking to leave a message for the target person. The method may further include a step of providing a prerecorded message to the answering person. In step D, if the speech recognition analysis determines that the spoken response is a hold request, a next step may include entering a wait state to wait for the target person to provide a spoken response to the telephone call. Upon the target person providing a spoken response to the telephone call, the method may further include initiating a speech recognition application with the target person. In step D, if the speech recognition analysis determines that the spoken response is a request for the identity of the entity responsible for the calling system, the method may further include initiating a prerecorded response indicating the identity of the calling party, repeating the prerecorded greeting which asks for the target person, and repeating step C through step E. In step D, if the speech recognition analysis determines that the spoken response indicates that the telephone number is not the correct number for the target person, the method may further include initiating a prerecorded apology message and terminating the telephone call. If the speech recognition analysis cannot determine a status of the spoken response, the method may further include repeating the prerecorded greeting which asks for the target person, and repeating step C through step E.

According to another aspect of the invention, a system for determining the status of an answered telephone during the course of an outbound telephone call includes an automated telephone calling device for placing a telephone call to a location having a telephone number at which a target person is listed, and a speech recognition device which, upon the telephone call being answered, initiates a prerecorded greeting which asks for the target person, receives a spoken response from an answering person and performs a speech recognition analysis on the spoken response to determine a status of the spoken response. If the speech recognition device determines that the answering person is the target person, the speech recognition device initiates a speech recognition application with the target person.

If the speech recognition device determines that the spoken response indicates that the answering person is not the target person, the speech recognition system may instruct the automated telephone calling device to initiate a prerecorded query asking for the target person. Upon the target person answering the telephone call, the speech recognition system may initiate a speech recognition application with the target person. If the speech recognition device determines that the spoken response indicates that the target person is not present at the location, the speech recognition system may instruct the automated telephone calling device to initiate a prerecorded query asking to leave a message for the target person. The automated telephone calling device may provide a prerecorded message to the answering person. If the speech recognition device determines that the spoken response is a hold request, the speech recognition may enter a wait state to wait for the target person to provide a spoken response to the telephone call. When the speech recognition device determines that the target person has provided a spoken response to the telephone call, the speech recognition device may initiate a speech recognition application with the target person. If the speech recognition device determines that the spoken response is a request for the identity of the entity responsible for the automated calling device, the speech recognition system may instruct the automated telephone calling device to initiate a prerecorded response indicating the identity of the entity and to repeat the prerecorded greeting which asks for the target person. Upon receiving a spoken response from the answering person, the speech recognition device may perform a speech recognition analysis on the spoken response to determine the status of the spoken response. If the speech recognition device determines that the spoken response indicates that the telephone number is not the correct number for the target person, the speech recognition system may instruct the automated telephone calling device to initiate a prerecorded apology message and to terminate the telephone call. If the speech recognition device cannot determine a status of the spoken response, the speech recognition system may instruct the automated telephone calling device to repeat the prerecorded greeting which asks for the target person, and, upon receiving a spoken response from the answering person, the speech recognition device may perform a speech recognition analysis on the spoken response to determine the status of the spoken response.

According to another aspect of the invention, a method for determining the status of an answered telephone during the course of an outbound telephone call includes:

A. placing, with an automated calling system, a telephone call to a location having a telephone number at which a target person is listed;

B. upon the telephone call being answered, playing a prerecorded greeting which asks for the target person;

C. receiving a spoken response from an answering person;

D. performing a speech recognition analysis on the spoken response to determine a status of the spoken response; and E. providing at least one of the following responses based on the speech recognition analysis:

a. if the speech recognition analysis determines that the answering person is the target person, initiating a speech recognition application with the target person;

b. if the speech recognition analysis determines that the spoken response indicates that the answering person is not the target person, initiating a prerecorded query asking for the target person, wherein, upon the target person answering the telephone call, the method further comprises initiating a speech recognition application with the target person;

c. if the speech recognition analysis determines that the spoken response indicates that the target person is not present at the location, initiating a prerecorded query asking to leave a message for the target person;

d. if the speech recognition analysis determines that the spoken response is a hold request, entering a wait state to wait for the target person to provide a spoken response to the telephone call, wherein, upon the target person providing a spoken response to the telephone call, the method further comprises initiating a speech recognition application with the target person;

e. if the speech recognition analysis determines that the spoken response is a request for the identity of the entity responsible for the calling system, initiating a prerecorded response indicating the identity of the calling party, repeating the prerecorded greeting which asks for the target person, and repeating step C through step E;

f. if the speech recognition analysis determines that the spoken response indicates that the telephone number is not the correct number for the target person, initiating a prerecorded apology message and terminating the telephone call; and g. if the speech recognition analysis cannot determine a status of the spoken response, repeating the prerecorded greeting which asks for the target person, and repeating step C through step E.

According to yet another aspect of the invention, a method of detecting an answering machine includes:

A. placing, with an automated calling system, a telephone call to a location having a telephone number at which a target person is listed;

B. upon the telephone call being answered, waiting for a predetermined time period for a spoken response;

C. upon receiving the spoken response, initiating a prerecorded greeting prompt which asks for the target person;

D. while playing the prerecorded greeting prompt, attempting to detect a further spoken response in excess of a predetermined time parameter;

E. in the absence of detecting the further spoken response during the playing of the prerecorded greeting prompt, initiating a query application;

F. upon detecting the further spoken response during the playing of the prerecorded greeting prompt, terminating the playing of the prerecorded prompt; and G. indicating that an answering machine has been detected.

The method may further include the step of attempting to detect a beep tone during the playing of the prerecorded greeting prompt and, upon the detection of a beep tone, interrupting the prerecorded greeting prompt and playing a prerecorded answering machine message prompt. The method may further include attempting to detect a beep tone during the playing of the prerecorded answering machine message prompt and, upon the detection of a beep tone, interrupting the prerecorded answering machine message prompt and replaying the prerecorded prompt.

BRIEF DESCRIPTION OF THE DRAWINGS

The foregoing and other objects of this invention, the various features thereof, as well as the invention itself may be more fully understood from the following description when read together with the accompanying drawings in which.

DETAILED DESCRIPTION

Figure 1:
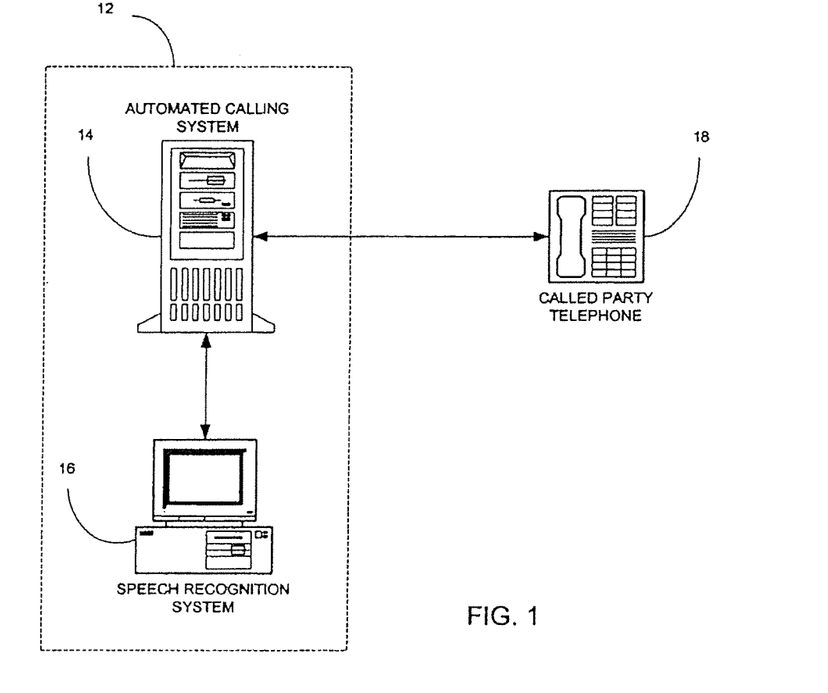
FIG. 1 is a schematic block diagram of the system for determining the status of an answered telephone during the course of an outbound telephone call in accordance with the present invention.
Figure 2:
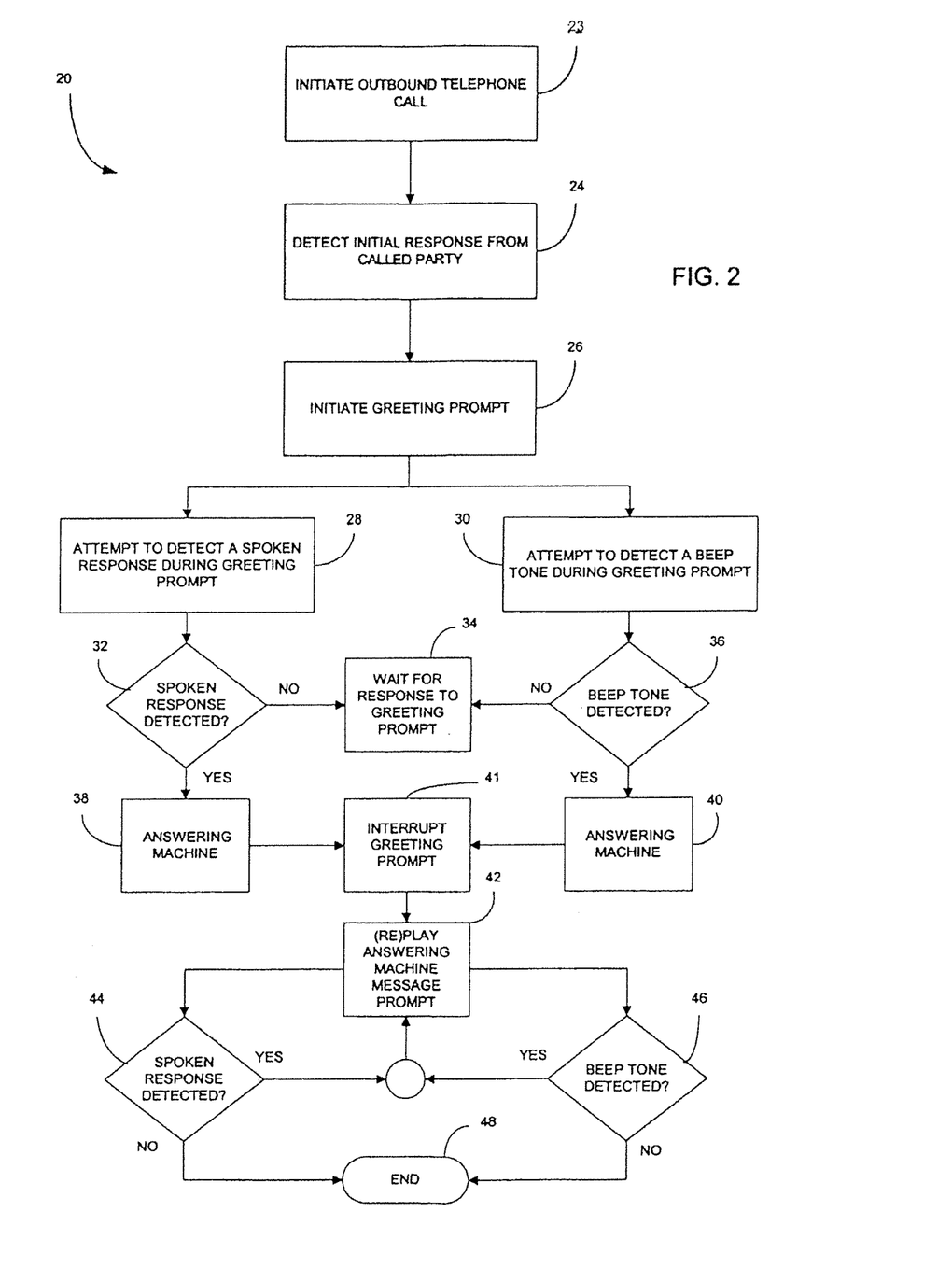
FIG. 2 is a flow diagram of a method for detecting an answering machine in accordance with the present invention.
Figure 3:
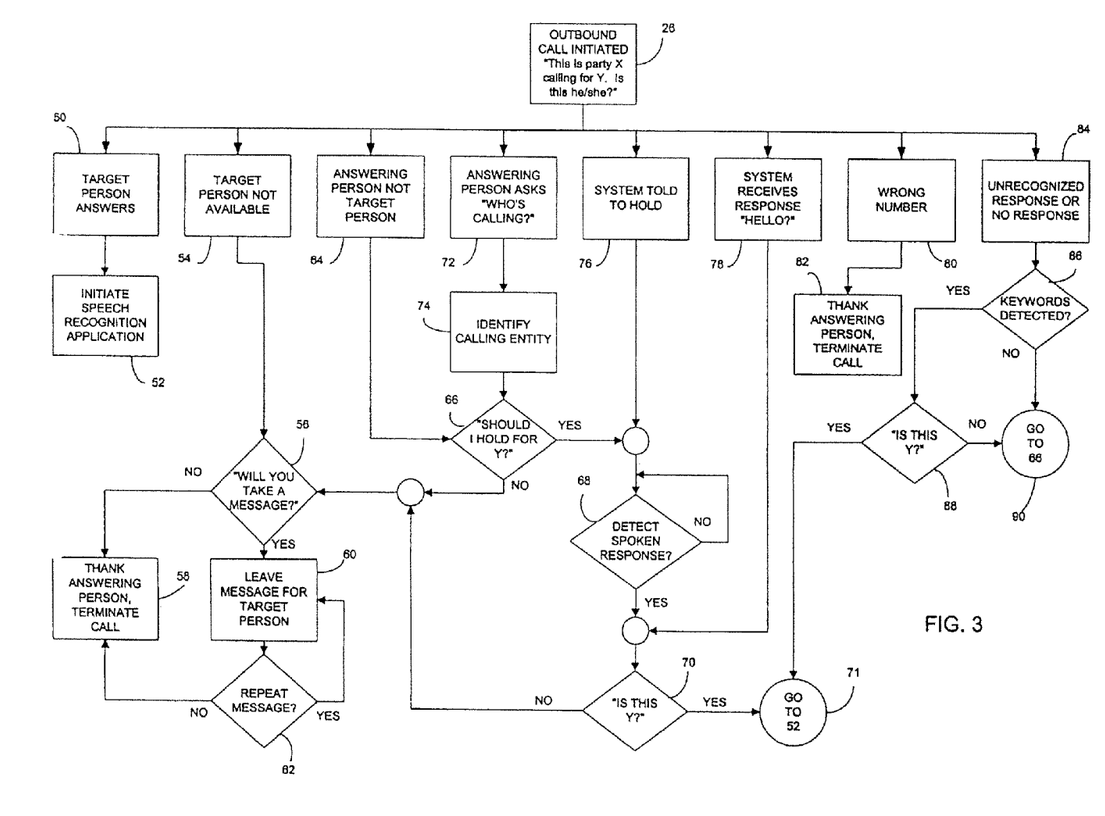
FIG. 3 is a flow diagram of a method for determining the status of an answered telephone during the course of an outbound telephone call in accordance with the present invention.

Referring now to FIGS. 1-3, a preferred embodiment of the present invention will be described. System 12, FIG. 1, includes an automated telephone calling system 14 and a speech recognition system 16. Preferably, the automated telephone calling system 14 is a personal computer such as an IBM PC or IBM PC compatible system or an APPLE MacINTOSH system or a more advanced computer system such as an Alpha-based computer system available from Compaq Computer Corporation or SPARC Station computer system available from SUN Microsystems Corporation, although a main frame computer system can also be used. In such a system, all of the components of the system will reside on the computer system, thus enabling the system to independently process data received from a respondent in the manner described below. Alternatively, the components may be included in different systems that have access to each other via a LAN or similar network. For example, the automated telephone calling device 14 may reside on a server system which receives the audio response from a telephone 18 and transmits the response to the speech recognition device 16.

The automated telephone calling system 14 may also include a network interface that facilitates receipt of audio information by any of a variety of a networks, such as telephone networks, cellular telephone networks, the Web, Internet, local area networks (LANs), wide area networks (WANs), private networks, virtual private networks (VPNs), intranets, extranets, wireless networks, and the like, or some combination thereof. The system 12 may be accessible by any one or more of a variety of input devices capable of communicating audio information. Such devices may include, but are not limited to, a standard telephone or cellular telephone 18.

Automated telephone calling system 14 includes a database of persons to whom the system 12 is capable of initiating telephone calls, each such person being referred to hereinafter as the "target person", a telephone number associated with each person and a recorded data file that includes the target person's name. Such automated telephone calling devices are known in the art. As is described below, the automated telephone calling system 14 is capable of initiating a telephone call to a target person and playing a prerecorded greeting prompt asking for the target person. The system 14 then interacts with speech recognition system 16 to analyze responses received from the person on telephone 18.

Speech recognition system 16 is an automated system on which a speech recognition application, including a series of acoustic outputs called prompts, which comprise queries about a particular topic, are programmed so that they can be presented to a respondent, preferably by means of a telephonic interaction between the querying party and the respondent. However, a speech recognition application may be any interactive application that collects, provides, and/or shares information. As examples, in the present invention, a speech application may be any of a group of interactive applications, including consumer survey applications; Web access applications; educational applications, including computer-based learning and lesson applications and testing applications; screening applications; consumer preference monitoring applications; compliance applications, including applications that generate notifications of compliance related activities, including notifications regarding product maintenance; test result applications, including applications that provide at least one of standardized tests results, consumer product test results, and maintenance results; and linking applications, including applications that link two or more of the above applications.

In the preferred embodiment, each speech recognition application includes an application file programmed into the speech recognition system 16. Preferably, the series of queries that make up the application is designed to obtain specific information from the respondents to aid in customer or consumer service, education and research and development of particular products or services or other functions. For example, a particular speech application could be designed to ask respondents specific queries about a particular product or service. The entity that issues the application may then use this information to further develop the particular product or service. An application may also be used to provide specific information to a particular person.

When the automated telephone calling device 12 initiates a call to the target person, it must be able to determine if the call was answered by a live person or by an answering machine. The method carried out by the system 12 is shown in flow diagram 20 of FIG. 2. In step 22, the automated telephone calling system initiates an outbound telephone call to a target person who is listed at the telephone number of telephone 18, FIG. 1. Upon the telephone 18 being answered, the system 12 waits until it detects either an initial greeting from a live person, which is typically "Hello", or the beginning of an answering machine message, step 24. The system does not need to distinguish between a live person or machine at this point in the transaction. After the initial response is detected, the system initiates a greeting prompt which asks for the target person using a prerecorded message that includes the target person's name, step 26. While this greeting prompt is being played, the speech recognition system 16 attempts to detect a spoken response which is longer than a predetermined time, for example 1,600 ms, step 32. This minimum time is observed to eliminate any line noise that might cause the speech recognition system to incorrectly detect a speech response from a live person. The system assumes that if a live person has answered the telephone, he or she will not talk during the initial greeting prompt. On the other hand, an answering machine will play its greeting message regardless of whether the calling party is speaking. If no spoken response longer than the predetermined time is detected, step 32, the speech recognition system 16 determines that a live person has answered the telephone and waits for a response to the greeting prompt, step 34. If a spoken response longer than the predetermined time is detected, step 32, the speech recognition system determines that an answering machine has answered the telephone, step 38.

While the greeting prompt is being played, the speech recognition system 16 also attempts to detect the short tone or "beep" output by an answering machine, step 30. If no beep tone is detected, step 36, the speech recognition system 16 determines that a live person has answered the telephone and waits for a response to the greeting prompt, step 34. If a beep tone is detected, step 36, the speech recognition system 16 determines that an answering machine has answered the telephone, step 40.

Once the speech recognition system 16 has determined that an answering machine has answered the telephone 18, at step 38 or 40, the greeting prompt is interrupted, step 41, and a prerecorded answering machine message prompt is played to the answering machine, step 42. As is the case during the playing of the greeting prompt, if, during the playing of the answering machine message prompt, a spoken response is detected which is greater than the predetermined time, step 44, or a beep tone is detected, step 46, the answering machine message prompt is interrupted and replayed, step 42. This insures that the answering machine message prompt is properly aligned with the answering machine recorder. When the answering machine message prompt has been played in its entirety without the detection of a spoken response, step 44 or a beep tone, step 46, the process ends, step 48.

As described above, when the telephone 18 is answered, the speech recognition system 16 plays a greeting prompt, step 26, FIG. 2. An example greeting prompt is "This is Party X calling for Y (Name of target person). Is this he (she)?" If no spoken response or beep tone is detected during the greeting prompt, the speech recognition system waits for a response to the greeting prompt, step 34. The speech recognition system 16 operates to determine the status of the person who answered the telephone and, if the answering person is not the target person, attempts to locate the target person. Step 26, in which the greeting prompt is initiated, is shown in FIG. 3, which is a flow diagram showing the method for determining the status of an answered telephone. After the greeting prompt is played, the speech recognition system 16 must be able to recognize and handle several different response scenarios. Each of these responses are described below. While examples of responses are included in the description, it will be understood that the speech recognition system 16 may be programmed to recognize any variation of the examples given below. The examples are provided to show expected responses in each of the response scenarios described below. Therefore, the present invention is not to be limited by these examples.

In step 50, the speech recognition system 16 determines that the answering person is the target person based on the answer to the greeting prompt. Typical answers that indicate that the answering person is indeed the target person include:
  A. "Yes"
  B. "This is him/her/he/she/me/Y (name asked for)
  C. "Yes it is"
  D. "Speaking"
  E. "Go ahead"
  F. "You got him/her"

When either of these responses is received by speech recognition system 16, the system analyzes the response and determines that the answering person is the target person. The speech recognition system then initiates the speech recognition application with the target person, step 52.

If the spoken response to the greeting prompt received by speech recognition system 16 is determined to be one of the following:
  A. "He/she is not here"
  B. "He/she is out (now)"
  C. "He/she is away"
the speech recognition system 16 determines that the target person is not available, step 54. Based on this determination, the speech recognition system 16 plays a message prompt asking the answering person if he/she will take a message, step 56. As shown in FIG. 3, a typical message prompt is "Will you take a message?" The speech recognition device 16 receives the spoken response to this prompt and analyzes it to determine the answer to the prompt. If the answer is determined to be "No", the speech recognition system 16 plays a termination prompt, step 58, thanking the answering person, and the call is terminated. If the answer to the message prompt is determined to be "Yes", the speech recognition system 16 plays a prerecorded message for the answering person, step 60. Such a message could identify the entity that is responsible for the call and provide a phone number for the target person to call. After the prerecorded message is played, a repeat prompt is played, step 62, giving the answering person the option of having the message repeated. Based on the response provided by the answering person, the speech recognition system either repeats the message, step 60, or plays the termination prompt, step 58, and terminates the call.

If the spoken response to the greeting prompt received by speech recognition system 16 is determined to be one of the following:

A. "No"
B. "It isn't"
C. "It isn't he/she/him/her"
D. "No, this is not he/she/him/her"
E. "No, this is not"
F. "This is his/her wife/husband"

the speech recognition system 16 determines that the answering person has indicated that the answering person is not the target person, step 64. Based on this determination, the speech recognition system plays a hold prompt asking the answering person if the speech recognition system 16 should hold for the target person, step 66. As shown in FIG. 3, a typical hold prompt is "Should I hold for Y?" The speech recognition device 16 receives the spoken response to this prompt and analyzes it to determine the answer to the prompt. If the answer is determined to be "No", the speech recognition system 16 plays the message prompt, step 56, and proceeds through the message procedure described above. If the answer is determined to be "Yes", the system waits, step 68, until a further spoken response is detected. When a spoken response is received by the speech recognition system 16, the system plays an identification prompt, step 70, asking if the person is the target person. If the answer to the identification prompt is determined to be "No", the speech recognition system 16 plays the message prompt, step 56, and proceeds through the message procedure described above. If the answer is determined to be "Yes", the speech recognition system then initiates the speech recognition application with the target person, step 52.

If the spoken response to the greeting prompt received by speech recognition system 16 is determined to be one of the following:

A. "Who is calling?"
B. "Who am I speaking with?"
C. "What can I do for you?"
D. "Can I ask what this is for?"
E. "Can I ask what this is about?"
F. "Can I tell him/her who this is?"
G. "What is this/it for/about?"
H. "Who is this?"
I. "Who are you?"

the speech recognition system 16 determines that the answering person has asked for the identity of the entity responsible for the call, step 72. Based on this determination, the speech recognition system plays a prerecorded message that identifies the entity and, optionally, the reason for the call, step 74. The speech recognition system then plays the hold prompt asking the answering person if the speech recognition system 16 should hold for the target person, step 66. The speech recognition device 16 receives the spoken response to this prompt and analyzes it to determine the answer to the prompt. If the answer is determined to be "No", the speech recognition system 16 plays the message prompt, step 56, and proceeds through the message procedure described above. If the answer is determined to be "Yes", the system waits, step 68, until a further spoken response is detected. When a spoken response is received by the speech recognition system 16, the system plays an identification prompt, step 70, asking if the person is the target person. If the answer to the identification prompt is determined to be "No", the speech recognition system 16 plays the message prompt, step 56, and proceeds through the message procedure described above. If the answer is determined to be "Yes", the speech recognition system then initiates the speech recognition application with the target person, step 52, as indicated by connector 71.

If the spoken response to the greeting prompt received by speech recognition system 16 is determined to be one of the following:

A. "Hold"
B. "He's/she's here, hold on"
C. "Just a minute/moment/second"
D. "Yes, hold on"

the speech recognition system 16 determines that the answering person has asked the system to hold, step 76. Based on this determination, the system waits, step 68, until a further spoken response is detected. When a spoken response is received by the speech recognition system 16, the system plays an identification prompt, step 70, asking if the person is the target person. If the answer to the identification prompt is determined to be "No", the speech recognition system 16 plays the message prompt, step 56, and proceeds through the message procedure described above. If the answer is determined to be "Yes", the speech recognition system then initiates the speech recognition application with the target person, step 52, as indicated by connector 71.

If, after the greeting prompt is played, step 26, the spoken response to the greeting prompt received by the speech recognition system 16 is determined to be "Hello?", step 78, the speech recognition system 16 determines that the phone has been picked up by the target person. Based on this determination, the system plays the identification prompt, step 70, asking if the person is the target person. If the answer to the identification prompt is determined to be "No", the speech recognition system 16 plays the message prompt, step 56, and proceeds through the message procedure described above. If the answer is determined to be "Yes", the speech recognition system then initiates the speech recognition application with the target person, step 52, as indicated by connector 71.

If the spoken response to the greeting prompt received by the speech recognition system 16 is determined to be one of the following:

A. "You (must) have the wrong number"
B. "You've got the wrong number"
C. "There is no one here by that name"
D. "No one by that name lives here"

the speech recognition system 16 determines that it has dialed a wrong number, step 80. Based on this determination, the speech recognition system 16 plays the termination prompt, step 82, thanking the answering person, and the call is terminated.

In the case in which the spoken response to the greeting prompt is unrecognized by the speech recognition system 16, or there is no response within a predetermined time period, such that none of the preceding steps can be followed, step 84, the speech recognition system 16 determines if any of the words of the response were recognized, step 86. If one or more of the words of the response are recognized, the speech recognition system 16 may play the identification prompt, asking if the answering person is the target person, step 88. In order to indicate to the answering person that the system did not understand the initial spoken response, the identification prompt may be modified to "I did not hear you well, is this Y?"

If none of the words of the spoken response to the greeting prompt are recognized, step 86, or if no response is received, the system jumps to step 66, as indicated by connector 90 in FIG. 3, in which the hold prompt is played. In order to indicate to the answering person that the system did not understand the initial spoken response, the hold prompt in this instance may be modified to "I did not hear you well, should I hold for Y?" The system then follows the steps from step 66 as described above.

Accordingly, the present invention provides a method of and system for determining the status of an answered telephone during the course of an outbound call. The system includes an automated telephone calling system which initiates a telephone call to a target person listed at a particular telephone number. When the telephone call is answered, the system first determines whether a live person or an answering machine has answered the telephone. If an answering machine is detected, the system leaves a message for the target person. If a live person answers the telephone, the system utilizes a speech recognition analysis to determine the status of the answering person and to attempt to locate the target person, if the answering person is not the target person. If the target person is available, the system initiates a speech recognition application. Otherwise, the system either attempts to leave a message for the target person, or simply terminates the call.

The invention may be embodied in other specific forms without departing from the spirit or essential characteristics thereof. For example, the system may be utilized to connect a live person to the target person. In this instance, once the system has determined that the target person is on the line, a live person may be connected to the target person, rather than the speech recognition algorithm, for the purpose of conducting a live conversation with the target person. The present embodiments are therefore to be considered in all respects as illustrative and not restrictive, the scope of the invention being indicated by the appended claims rather than by the foregoing description, and all changes which come within the meaning and range of the equivalency of the claims are therefore intended to be embraced therein.

What is claimed:

1. A method of determining the status of an answered telephone during the course of an outbound telephone call comprising:
   (A) placing, with an automated calling system, a telephone call to a location having a telephone number at which a target person is listed;
   (B1) upon said telephone call being answered, initiating a prerecorded greeting which asks for the target person;
   (B2) while the prerecorded greeting is being played, attempting to detect a spoken response that is longer than a predetermined time;
   (C) based on detecting that the spoken response is not longer than the predetermined time, determining that a spoken response has been received from an answering person;
   (D) performing a speech recognition analysis on said spoken response to determine a status of said answering person; and
   (E) upon said speech recognition analysis determining that said answering person is said target person, initiating a speech recognition application with said target person, wherein the speech recognition application comprises a consumer survey application, an educational application, a learning and lesson application, a testing application, a test results application, or a compliance application.

2. The method of claim 1 wherein, in step D, if said speech recognition analysis determines that said spoken response indicates that said answering person is not said target person, a next step comprises initiating a prerecorded query asking for said target person.

3. The method of claim 2 wherein, upon said target person answering said telephone call, said method further comprises initiating a speech recognition application with said target person.

4. The method of claim 1 wherein, in step D, if said speech recognition analysis determines that said spoken response indicates that said target person is not present at said location, a next step comprises initiating a prerecorded query asking to leave a message for said target person.

5. The method of claim 4 further comprising a step of providing a prerecorded message to said answering person.

6. The method of claim 1 wherein, in step D, if said speech recognition analysis determines that said spoken response is a hold request, a next step comprises entering a wait state to wait for said target person to provide a spoken response to said telephone call.

7. The method of claim 6 wherein, upon said target person providing a spoken response to said telephone call, said method further comprises initiating a speech recognition application with said target person.

8. The method of claim 1 wherein, in step D, if said speech recognition analysis determines that said spoken response is a request for the identity of the entity responsible for the calling system, the method further comprises initiating a prerecorded response indicating the identity of the calling party, repeating said prerecorded greeting which asks for the target person, and repeating step C through step E.

9. The method of claim 1 wherein, in step D, if said speech recognition analysis determines that said spoken response indicates that said telephone number is not the correct number for the target person, the method further comprises initiating a prerecorded apology message and terminating said telephone call.

10. The method of claim 1 wherein, in step D, if said speech recognition analysis cannot determine a status of said spoken response, said method further comprises repeating said prerecorded greeting which asks for the target person, and repeating step C through step E.

11. A system for determining the status of an answered telephone during the course of an outbound telephone call comprising:
   an automated telephone calling device for placing a telephone call to a location having a telephone number at which a target person is listed; and
   a speech recognition device which, upon said telephone call being answered, initiates a prerecorded greeting which asks for the target person, receives a spoken response from an answering person and performs a speech recognition analysis on said spoken response to determine a status of said answering person;

wherein the speech recognition device is configured to, while the prerecorded greeting is being played, attempt to detect a spoken response that is longer than a predetermined time;

wherein the speech recognition device is further configured to, based on detecting that the spoken response is not longer than the predetermined time, determine that a spoken response has been received from the answering person;

wherein, upon said speech recognition device determining that said answering person is said target person, said speech recognition device initiates a speech recognition application with said target person, wherein the speech recognition application comprises a consumer survey application, an educational application, a learning and lesson application, a testing application, a test results application, or a compliance application.

12. The system of claim 11 wherein, if said speech recognition device determines that said spoken response indicates that said answering person is not said target person, said speech recognition system instructs said automated telephone calling device to initiate a prerecorded query asking for said target person.

13. The system of claim 12 wherein, upon said target person answering said telephone call, said speech recognition system initiates a speech recognition application with said target person.

14. The system of claim 11 wherein, if said speech recognition device determines that said spoken response indicates that said target person is not present at said location, said speech recognition system instructs said automated telephone calling device to initiate a prerecorded query asking to leave a message for said target person.

15. The system of claim 14 wherein said automated telephone calling device provides a prerecorded message to said answering person.

16. The system of claim 11 wherein, if said speech recognition device determines that said spoken response is a hold request, said speech recognition enters a wait state to wait for said target person to provide a spoken response to said telephone call.

17. The system of claim 16 wherein, when said speech recognition device determines that said target person has provided a spoken response to said telephone call, said speech recognition device initiates a speech recognition application with said target person.

18. The system of claim 11 wherein, if said speech recognition device determines that said spoken response is a request for the identity of the entity responsible for the automated calling device, the speech recognition system instructs said automated telephone calling device to initiate a prerecorded response indicating the identity of the entity and to repeat said prerecorded greeting which asks for the target person;

wherein, upon receiving a spoken response from the answering person, said speech recognition device performs a speech recognition analysis on said spoken response to determine the status of said spoken response.

19. The method of claim 11 wherein, if said speech recognition device determines that said spoken response indicates that said telephone number is not the correct number for the target person, said speech recognition system instructs said automated telephone calling device to initiate a prerecorded apology message and to terminate said telephone call.

20. The method of claim 11 wherein, if said speech recognition device cannot determine a status of said spoken response, said speech recognition system instructs said automated telephone calling device to repeat said prerecorded greeting which asks for the target person;

wherein, upon receiving a spoken response from the answering person, said speech recognition device performs a speech recognition analysis on said spoken response to determine the status of said spoken response.

\* \* \* \* \*